(12) United States Patent
Cava

(10) Patent No.: US 7,156,592 B1
(45) Date of Patent: Jan. 2, 2007

(54) TRUCK LOAD CONTROL APPARATUS

(76) Inventor: Stephen J. Cava, 209 Bortondale Rd., Media, PA (US) 19063

( * ) Notice: Subject to any disclaimer, the term of this patent is extended or adjusted under 35 U.S.C. 154(b) by 0 days.

(21) Appl. No.: 11/272,264

(22) Filed: Nov. 14, 2005

(51) Int. Cl.
*B60P 7/08* (2006.01)

(52) U.S. Cl. .......................... 410/32; 410/94; 410/121; 410/153

(58) Field of Classification Search ................. 410/32, 410/36, 37, 42, 94, 104, 121, 153; 224/402–405, 224/497, 501, 502, 510, 522, 525, 531, 549, 224/552–554; 296/32, 36, 50, 57.1
See application file for complete search history.

(56) References Cited

U.S. PATENT DOCUMENTS 5,433,566 A * 7/1995 Bradley ...................... 410/121
6,099,220 A * 8/2000 Poth ............................ 410/94
6,210,087 B1 * 4/2001 Bacon ......................... 410/35

* cited by examiner

*Primary Examiner*—Stephen Gordon
(74) *Attorney, Agent, or Firm*—Robert S. Lipton. Esq.; Lipton, Weinberger & Husick

(57) ABSTRACT

The present Invention is an apparatus for controlling a load in a vehicle, particularly a pickup truck where the load is longer than the bed of the truck. The apparatus comprises a channel mounted to or defined by the bed or tailgate of the truck. A load-restraining member slidably engages the channel to adjust for loads of different sizes. The load-restraining member also rotatably engages the channel and may move between an upright position for use and a horizontal position for storage. The load-restraining member may be secured in the upright position.

10 Claims, 6 Drawing Sheets

TRUCK LOAD CONTROL APPARATUS

I. BACKGROUND OF THE INVENTION

A. Field of the Invention

The Invention relates to the control of a load in the bed of a truck, such as a pickup truck. Specifically, the Invention is a movable restraint to prevent long objects such as pipes from shifting while the objects are being transported.

B. Description of the Prior Art

The control of an object to be carried in a pickup truck or other truck is a familiar problem. The problem is compounded when the object to be transported is longer that the bed of the truck and extends over the tailgate. A long, round object, such as a pipe or conduit, may roll in an uncontrolled manner and may roll out of the bed of the truck. An apparatus is needed to control an object loaded into a pickup truck where the object extends over the tailgate of the pickup truck. An apparatus is also needed to control a long object loaded onto or in any vehicle, such as a large truck, a sports-utility vehicle or a station wagon.

II. SUMMARY OF THE INVENTION

The Invention is a system of adjustable, load-restraining members that may be deployed when a long object is transported in a pickup truck, a large truck, a sports utility vehicle, station wagon, or other vehicle. The load-restraining members restrict the lateral movement of the load in response to lateral accelerations of the truck. The load-restraining members are mounted to the tailgate. The position of the load-restraining members on the tailgate may be adjusted to accommodate loads having different widths. When not in use, the load-restraining members fold out of the way.

A channel member is adapted to be mounted to the top surface of a tailgate, the bed of a truck, or other locations on a vehicle. The channel member defines a longitudinal channel having a slot. Two slidable members slidably engage the interior of the longitudinal channel and may slide in a longitudinal direction within the longitudinal channel. A load-restraining member has an axis of rotation and rotatably engages the two slidable members on opposite sides of the load-restraining member. Rotation of the load-restraining member about the rotatable engagement with the slidable members allows the load-restraining member to move from a horizontal, or second, position to an upright, or first, position. The slidable engagement between the slidable members and the longitudinal channel allows the load-restraining member to be selectably moved in the longitudinal direction to adjust the load-restraining member for loads of different sizes.

The first position of the load-restraining member is a load-restraining position while the second position is a stored position. The load-restraining member extends through the slot when in the first, or upright, position. The load-restraining member does not extend above the slot and is contained within the longitudinal channel when in the second, or stored, position.

The channel member also defines a 'T' slot below the longitudinal channel. A fastener slidably engages the T-slot. A threaded inner rod extends the length of the load-restraining member and selectably engages the fastener, selectably clamping the load-restraining member into the vertical position.

The apparatus of the invention may be incorporated into the design of the tailgate of a new truck by a truck manufacturer. The apparatus may be incorporated into the design of any vehicle, such as a truck, sports-utility vehicle, a station wagon or any other vehicle. Alternatively, the apparatus may be retrofitted to an existing vehicle.

III. BRIEF DESCRIPTION OF THE DRAWINGS

IV. DESCRIPTION OF AN EMBODIMENT

Figure 1:
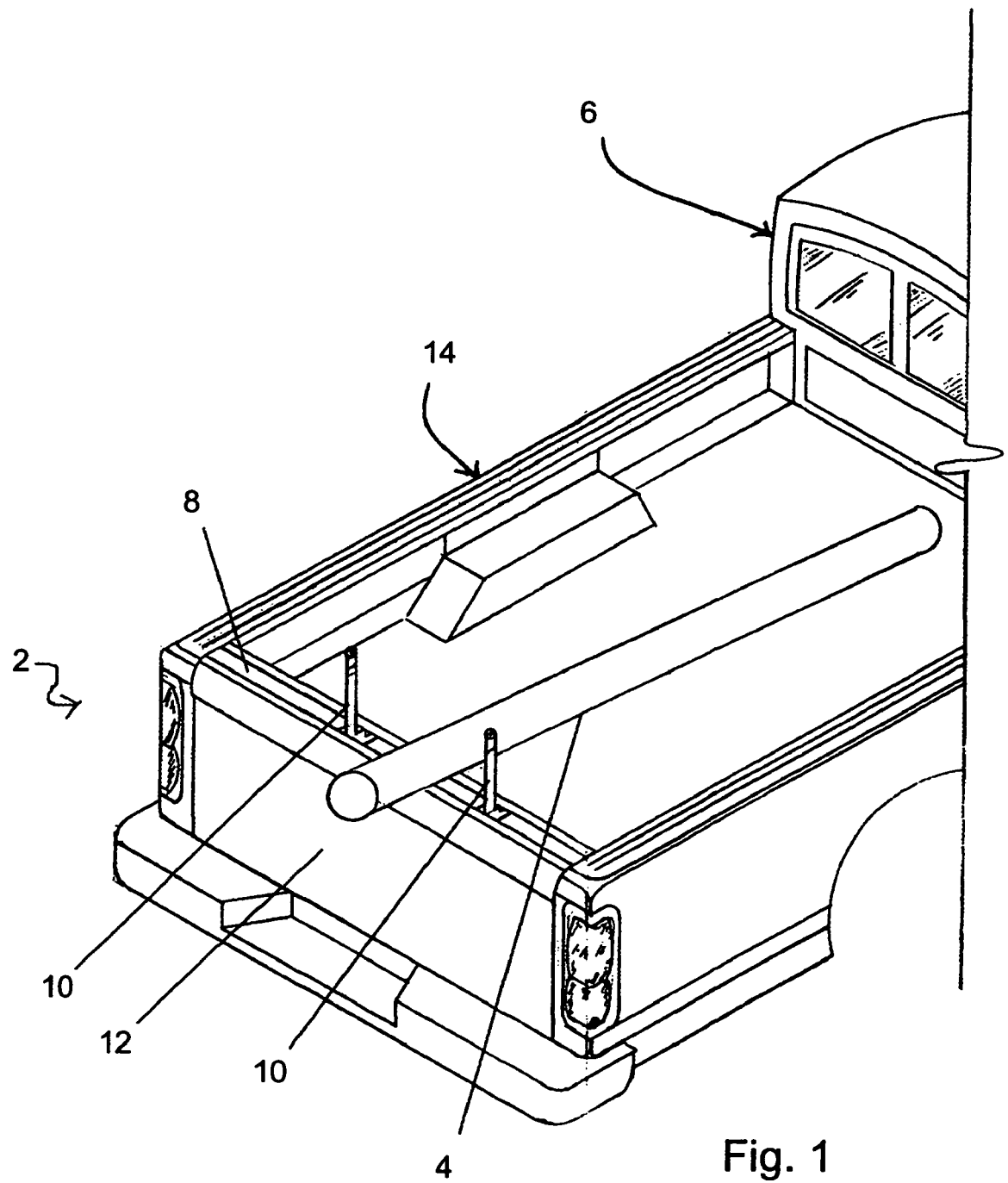
FIG. 1 is a perspective view of the invention installed on a truck and in use.

As shown by FIG. 1, the invention is an apparatus 2 for controlling a load 4 in a truck 6, particularly a load 4 that is too long to fit within the bed of a pickup or similar truck 6. The apparatus 2 comprises a longitudinal channel 8 and at least one load-restraining member 10. The load-restraining member 10 selectably slides in the longitudinal channel 8 to allow the apparatus 2 to be adjusted to fit a particular load 4. The load-restraining member 10 selectably folds out of the way when not in use, as is more fully described below. The apparatus 2 may be mounted to the tailgate 12 of the truck 6. Alternatively, the apparatus 2 may be mounted to bed 14 of the truck 6. The apparatus 2 also may be used to control a load 4 on any vehicle, such as a sports-utility vehicle, station wagon or large truck.

Figure 2:
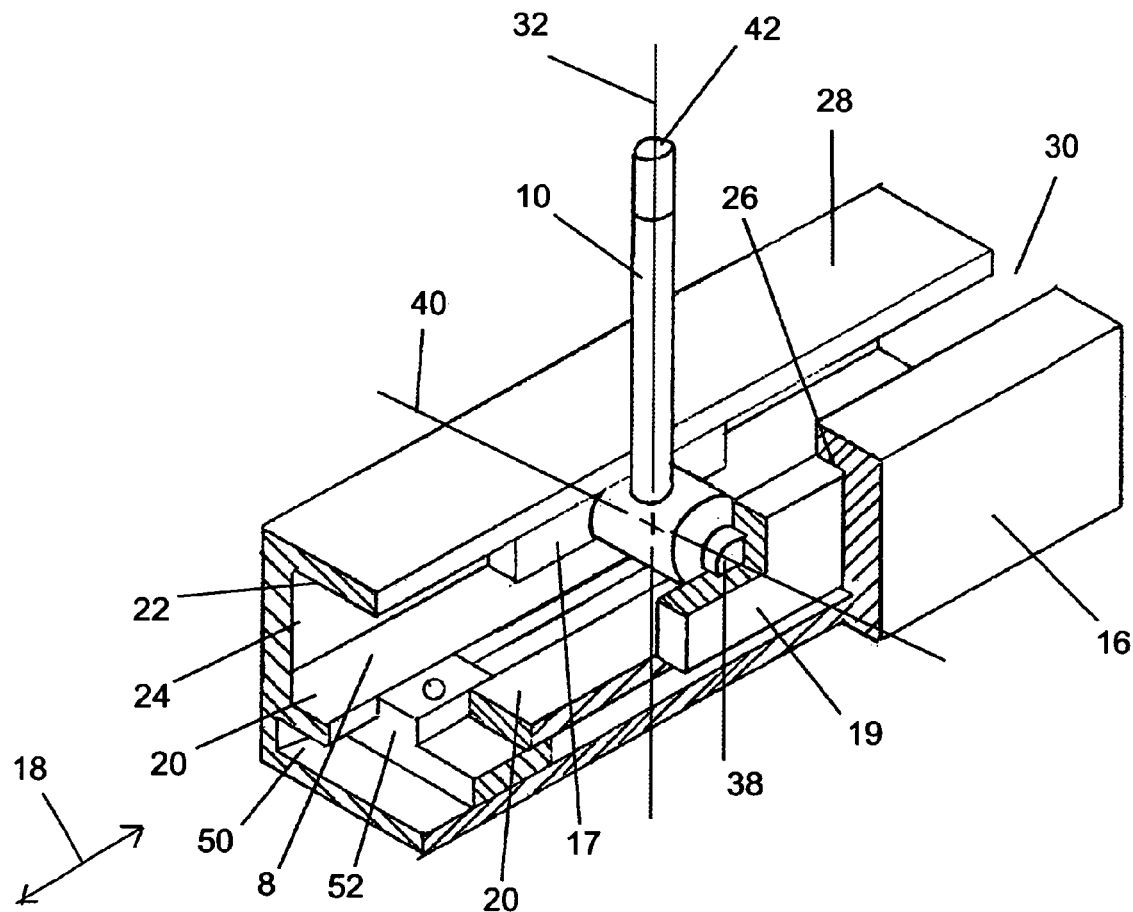
FIG. 2 is a partial cutaway perspective view of the longitudinal channel and load-restraining member in a first position.
Figure 3:
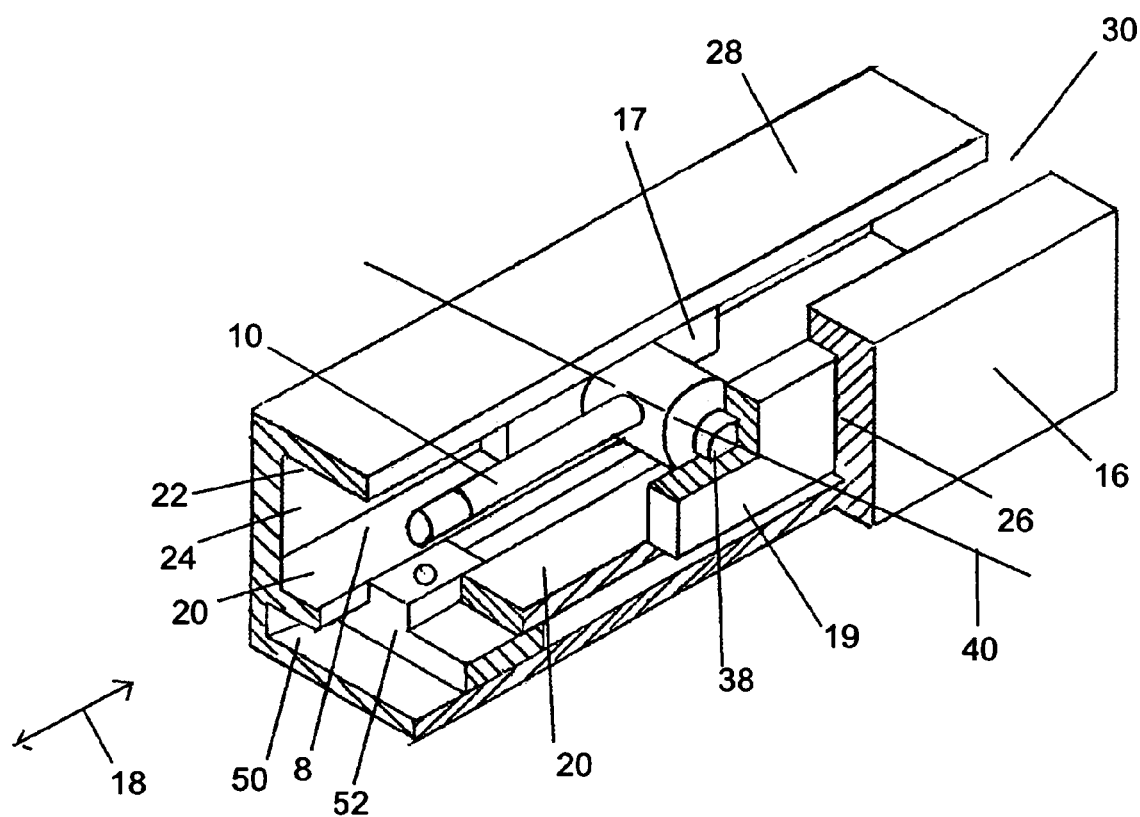
FIG. 3 is a partial cutaway perspective view of the longitudinal channel and load-restraining member in a second position.
Figure 4:
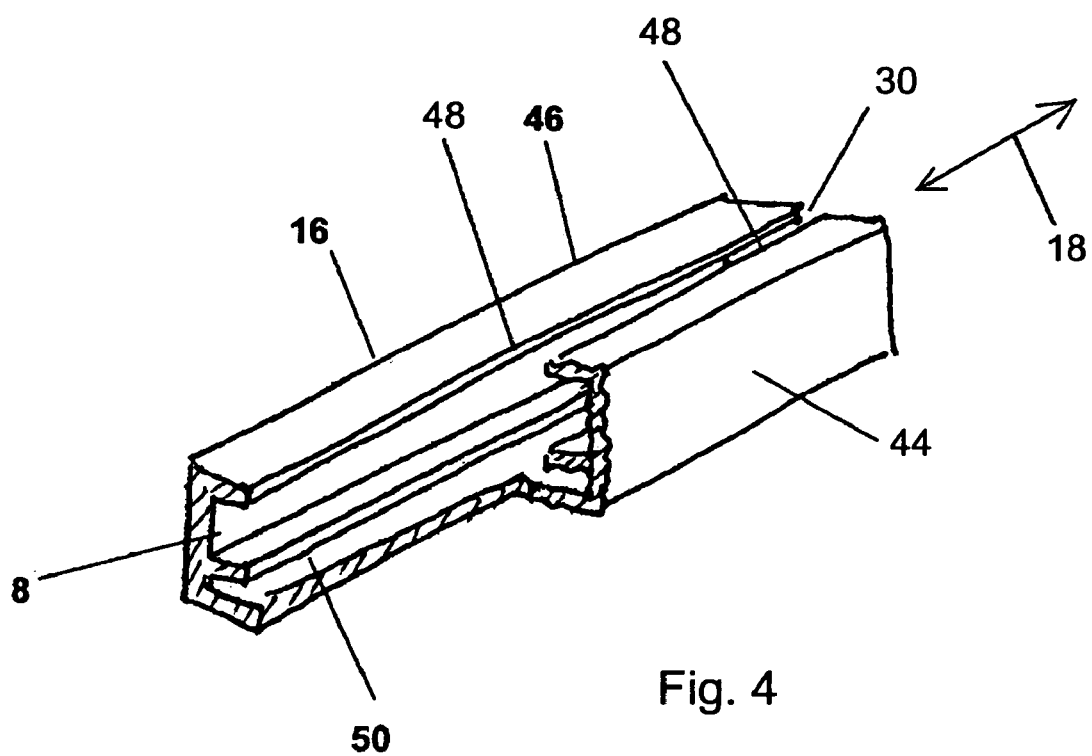
FIG. 4 is a partial cutaway perspective view of a longitudinal channel and T-slot.

FIGS. 2 is a perspective cutaway view of the load-restraining member 10 in a first, or upright, position. FIG. 3 is a perspective cutaway view of the load-restraining member 10 in a second, or stored, position. FIG. 4 is a perspective cutaway view of the longitudinal channel 8.

As shown by FIGS. 2, 3 and 4, the channel 8 is an opening defined by a channel member 16 and has a longitudinal direction 18. First slidable member 17 and second slidable member 19 engage the channel 8 on opposite sides of the load-restraining member 10 and may slide in the longitudinal direction 18 within the channel 8. Load-restraining member 10 rotatably engages first and second slidable members 17, 19 and may rotate between the first position (shown by FIG. 2) and the second position (shown by FIG. 3). The load-restraining member 10 therefore may slide back and forth in the longitudinal direction 18 to adjust the load-restraining member 10 to the load 4 and may be rotated between the first (upright) and second (stored) positions.

The channel member 16 has a lower bearing surface 20, an upper bearing surface 22, a first side bearing surface 24 and a second side bearing surface 26. First slidable member 17 slidably engages the bearing surfaces 20, 22 and 24. Second slidable member 19 slidably engages the bearing surfaces 20, 22, and 26. The bearing surfaces 20, 22, 24, 26 constrain the motion of the first and second slidable members 17, 19 and hence load-restraining member 10 within the channel 8 and preclude sliding movement of the load-restraining member 10 in any direction except the longitudinal direction 18. Also as shown by FIG. 2, an upper side 28 of the channel member 16 defines a slot 30 communicating through the upper side 28.

The load-restraining member 10 has a longitudinal axis 32 and an axis of rotation 40. Longitudinal axis 32 is generally orthogonal to axis of rotation 40. Load-restraining member 10 rotatably engages first slidable member 17 and second slidable member 19 so that load-restraining member 10 may rotate about the axis of rotation 40 between the first, or upright, and second, or stored, positions. In the embodiment illustrated by FIGS. 2 and 3, the lower end 34 of load-restraining member 10 defines a circular axle 38 that is concentric to the axis or rotation 40 and that rotatably engages first and second slidable members 17, 19. Any of the other means known in the art for a rotatable connection between load-restraining member 10 and first and second slidable members 17, 19 that allows load-restraining member 10 to rotate about the axis of rotation 40 is contemplated by the invention.

The load-restraining member 10 has an upper end 42. When the load-restraining member 10 is in the first, or upright, position, the upper end 42 of load-restraining member 10 extends through slot 30, as shown by FIGS. 1 and 2. When the load-restraining member 10 is in the second, or horizontal, position, the upper end of load-restraining member 10 does not extend through slot 30 and is contained within longitudinal channel 8, as shown by FIG. 3.

While the axle 38 illustrated in FIGS. 2 and 3 is generally circular in cross section, other shapes are suitable. For example, axle 38 may form an oblong or cam shape in cross section to clamp load-restraining member 10 in place in the upright position and to provide that the clamping action of the cam is released when the load-restraining member is rotated to the second, or horizontal position. Load-restraining member 10 or axle 38 may be equipped with a stop to prevent the load-restraining member to be rotated past the first position from the second position.

Two slidable members 17, 19 are not required for operation of the apparatus 2. A slidable member 17, 19 slidably engaging channel 8 is adequate, providing the motion of the load-restraining member 10 is adequately constrained by channel member 16. Channel member 16 adequately constrains motion of the load-restraining member 8 if the load-restraining member 10 is prevented from disengaging from channel 8 in response to a load 4, as by twisting of the load-restraining member 10 or by movement of the single slidable member 17, 19 longitudinal to the axis of rotation 40.

As shown by FIGS. 2 and 3, channel member 16 may be formed of a single piece, as an extrusion, or may be formed of multiple pieces. As shown by FIG. 4, channel member 16 may be comprised of a first channel member 44 and a second channel member 46. First channel member 44 and second channel member 46 each has an open side 48. When open sides 48 of first and second channel members 44, 46 are placed proximal to each other, first and second channel members 44, 46 together define longitudinal channel 8 and slot 30.

In the embodiment of FIGS. 2 and 3, channel member 16 defines longitudinal channel 8 and also defines a T-slot 50. Channel 8 is defined by the upper portion of channel member 16 and the T-slot 50 is defined by the lower portion of channel member 16. A fastener 52 is constrained within T-slot 50 and is slidable in T-slot 50 in the longitudinal direction 18. Load-restraining member 10 is slidable in longitudinal channel 8, also in the longitudinal direction 18.

When the load-restraining member 10 is in the first position shown by FIG. 2, a user may selectably attach the load-restraining member 10 to the fastener 52, clamping the load-restraining member 10 in the upright position. Clamping of the load-restraining member 10 in the upright position also fixes the load-restraining member 10 in the longitudinal direction 18. The user may unclamp the load-restraining member 10 from the upright position and move the load-restraining member 10 in the longitudinal direction 18 within channel 8.

As illustrated by FIGS. 1 and 2, when the load-restraining member 10 is in the first position, the upper end 42 of load-restraining member 10 extends through slot 30 to restrain load 4. As shown by FIG. 3, when the load-restraining member 10 is in the second position, the upper end 42 of the load-restraining member 10 is in the horizontal position and does not extend through the slot 30.

Figure 5:
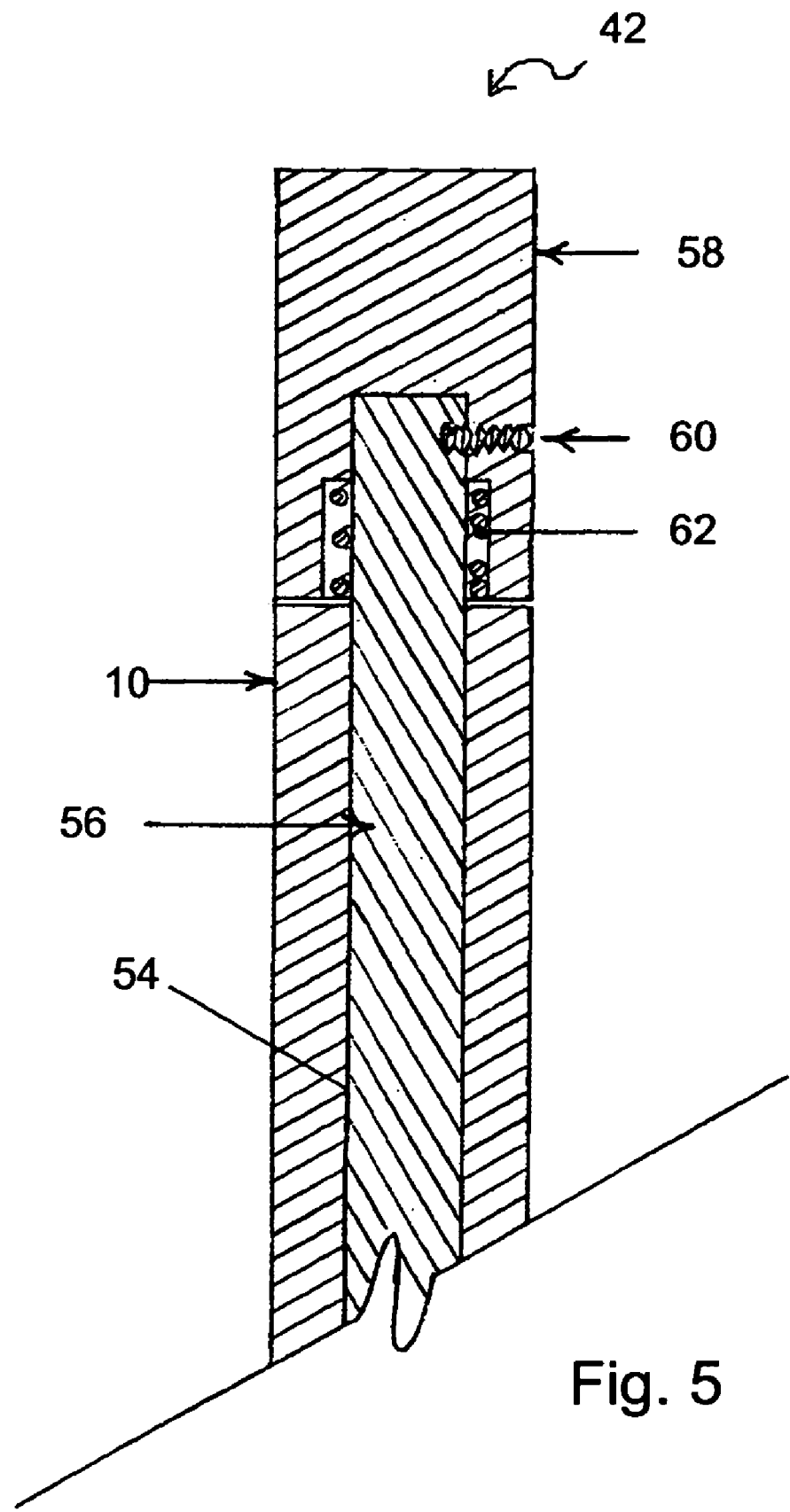
FIG. 5 is a detail cross section of the upper end of the load-restraining member.
Figure 6:
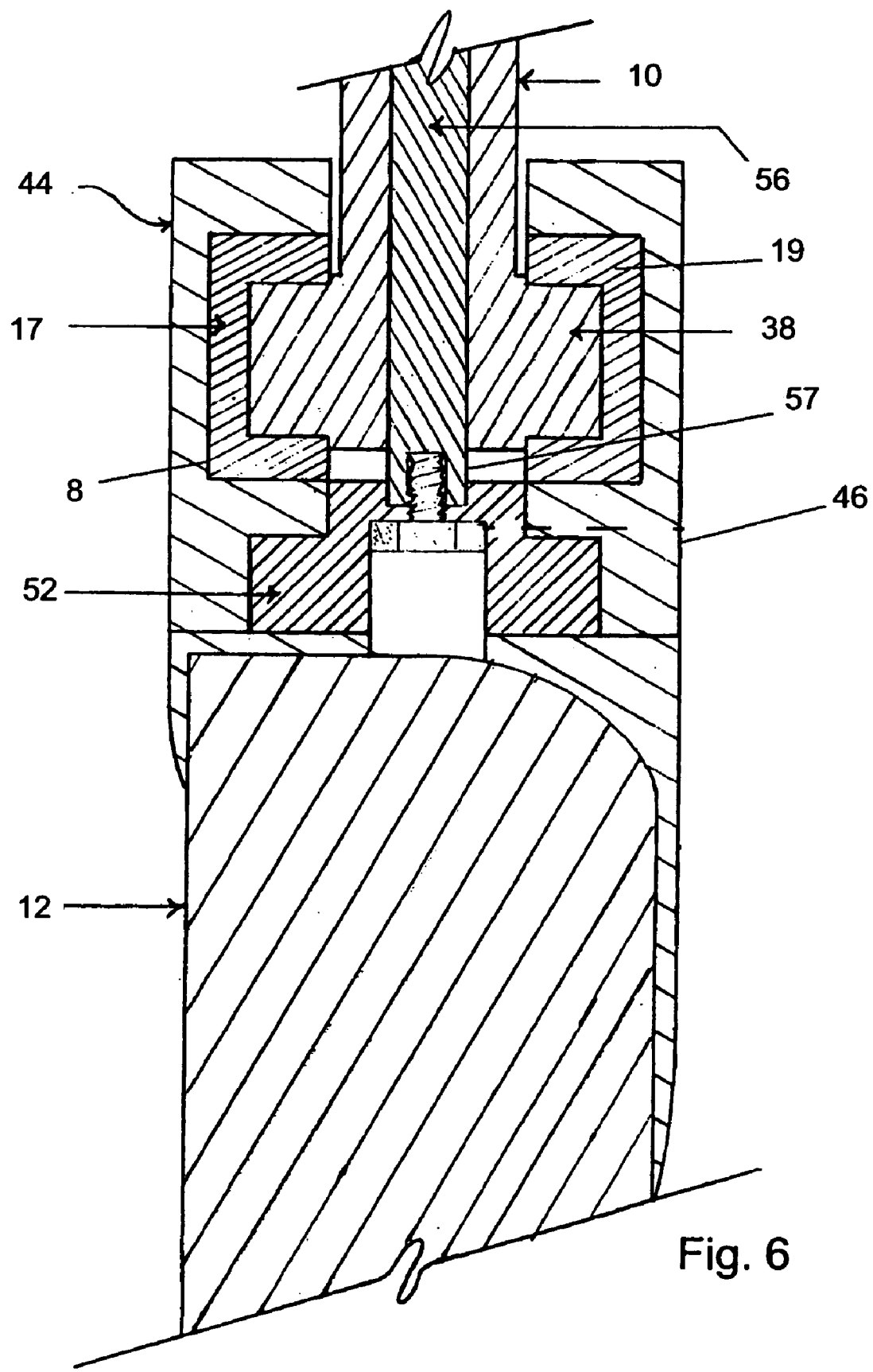
FIG. 6 is a detail cross section of the invention installed on a tailgate.

FIGS. 5 and 6 are sectional views showing the mechanism by which the load-restraining member 10 selectably attaches to fastener 52. The section of FIG. 5 shows the upper end 42 of the load-restraining member 10. Load-restraining member 10 defines a longitudinal opening 54. Disposed within the longitudinal opening 54 is an inner rod 56. Inner rod 56 extends the length of the longitudinal opening 54. At the upper end 42 of load-restraining member 10 is a knob 58. Knob 58 is connected to inner rod 56 by set screw 60. Knob 58 and inner rod 56 are rotatable with respect to load-restraining member 10, so that turning of the knob 58 by a user will also turn the inner rod 56. Spring 62 urges the knob 58 and hence inner rod 56 away from load-restraining member 10.

FIG. 6 is a cross section normal to the longitudinal direction 18 of the longitudinal channel 8 and intersecting the axis of rotation 40 and the longitudinal axis 32. FIG. 6 shows the load-restraining member 10 in the first, or upright, position. Inner rod 56 extends the length of load-restraining member 10 and selectably engages fastener 52 when the load-restraining member 10 is in the first position. The selectable engagement illustrated by FIG. 6 is a threaded engagement. A thread defined by fastener 52, which may be either a male or a female thread, engages a mating thread defined by the bottom end 57 of inner rod 56. A user will turn knob 58, as shown by FIG. 6, to engage or disengage inner rod 56 and fastener 52. When the inner rod 56 and fastener 52 are disengaged, spring 62 will urge inner rod away from fastener 52.

When the inner rod 56 and the fastener 52 are disengaged, load-restraining member 10 and fastener 52 are separately movable within longitudinal channel 8 and T-slot 50, respectively. To use the apparatus 2, a user will locate fastener 52 at a desired location in T-slot 50 selected to accommodate a particular load 4. The user then will move the load-restraining member 10 in the longitudinal direction 18 until load-restraining member 10 is directly above fastener 52. The user will place the load-restraining member 10 in the upright position and will engage the thread of the inner rod 56 and the fastener 52. The user will turn knob 58 to clamp load-restraining member 10 in the upright position in the desired location.

In describing the above embodiments of the invention, specific terminology was selected for the sake of clarity. However, the invention is not intended to be limited to the specific terms so selected, and it is to be understood that each specific term includes all technical equivalents that operate in a similar manner to accomplish a similar purpose.

I claim:

1. A load-restraining apparatus to control a vehicle load, the apparatus comprising:
   a. a load-restraining member having an axis of rotation, said load-restraining member being adapted for selectable rotation about said axis of rotation between a first position and a second position;
   b. a first slidable member and a second slidable member, said load-restraining member rotatably engaging said first slidable member and said second slidable member, said first and said second slidable members being disposed on opposite sides of said load-restraining member;
   c. a channel member adapted to be mounted to or defined by a vehicle, said channel member defining a longitudinal channel, said longitudinal channel defining a longitudinal direction, said first and said second slidable members slidably engaging said longitudinal channel, said first and said second slidable members being selectably movable in said longitudinal direction, said axis of rotation of said load-restraining member being substantially orthogonal to said longitudinal direction, said channel member having an upper side, said upper side of said channel member defining a slot, said load-restraining member having an upper end, said upper end of said load-restraining member extending through said slot when said load-restraining member is in said first position, said upper end of said load-restraining member not extending through said slot when said load-restraining member is in said second position, said channel member having a lower bearing surface, an upper bearing surface, a first side bearing surface and a second side bearing surface, said lower, upper, first side and second side bearing surfaces defining said longitudinal channel, said lower, upper and first side bearing surfaces slidably engaging said first slidable member, said lower, upper and second side bearing surfaces slidably engaging said second slidable member, said lower, upper, first side and second side bearing surfaces substantially precluding a sliding motion of said first and said second slidable members in said longitudinal channel in any direction other than said longitudinal direction;
   d. a T-slot defined by said channel member;
   e. a fastener slidably engaging and restrained by said T-slot, said fastener being adapted to selectably retain said load-restraining member in said first position.

2. The apparatus of claim 1 wherein said rotatable engagement between said first and said second slidable members and said load-restraining member being concentric to said axis of rotation of said load-restraining member.

3. The apparatus of claim 2, the apparatus further comprising:
   a. an inner rod, said load-restraining member defining a longitudinal opening, said inner rod being disposed within said longitudinal opening;
   b. a knob, said knob engaging said inner rod such that rotation of said knob rotates said inner rod, said knob rotatably engaging said upper end of said load-restraining member, said inner rod having a bottom end, said bottom end of said inner rod being adapted to selectably engage said fastener when said load-restraining member is in said first position, thereby securing said load-restraining member in said first position.

4. The apparatus of claim 3 wherein said channel member comprises:
   a. a first channel member;
   b. a second channel member, each of said first channel member and said second channel member having an open side, said open sides of said first and said second channel members being adapted to be located proximal one to the other, said open sides of said first and said second channel members defining said longitudinal channel and said T-slot when said open sides of said first and said second channel members are located proximal one to the other.

5. The apparatus of claim 4 wherein said first and said second channel members define said upper surface and define said slot when said first and said second channel members are located proximal one to the other.

6. The apparatus of claim 5 wherein said adaptation of said channel member to be mounted to said vehicle comprises: each of said first and said second channel members being adapted to be mounted to a top of a tailgate of a truck.

7. The apparatus of claim 3 wherein said channel member is defined by a tailgate of a truck.

8. A load-restraining apparatus, the apparatus comprising:
   a. a load-restraining member having a longitudinal axis and an axis of rotation, said axis of rotation being substantially orthogonal to said longitudinal axis, said load-restraining member being rotatable about said axis of rotation between a first position and a second position, said load-restraining member being in an upright position when said load-restraining member is in said first position, said load-restraining member being in a horizontal position when said load-restraining member is said second position;
   b. a pair of slidable members, said slidable members being disposed on opposite sides of said load-restraining member, said load-restraining member rotatably engaging each of said slidable members;
   c. a first channel member and a second channel member, each of said first and said second channel members having an open side, said open side of each of said first and said second channel members being proximal to said open side of the other of said first and said second channel members, said open sides of said first and said second channel members in combination defining a longitudinal channel having a longitudinal direction, said first and said second channel members being adapted to engage a tailgate of a truck or said first and said second channel members being defined by said tailgate of said truck, said pair of slidable members slidably engaging said longitudinal channel, said pair of slidable members being selectably slidable in said longitudinal direction, said first channel member and said second channel member each having an upper side, said upper sides of said first channel member and said second channel member in combination defining a slot, said load-restraining member having an upper end, said upper end of said load-restraining member extending through said slot when said load-restraining member is in said first position, said upper end of said load-restraining member not extending through said slot when said load-restraining member is in said second position;
   d. means to retain said load-restraining member in said upright position, said means to retain said load-restraining member in said upright position comprising: a fastener, each of said first and second channel members having a lower portion, said lower portions of said first and second channel members together defining a T-slot, said T-slot receiving and retaining said fastener; and an inner rod, said load-restraining member defining a longitudinal opening generally concentric with said longitudinal axis of said load-restraining member, said inner rod being disposed within said longitudinal opening, said inner rod selectably engaging said fastener.

9. The apparatus of claim 8 wherein said fastener slidably engages said T-slot.

10. The apparatus of claim 9 wherein said selectable engagement between said fastener and said inner rod is a threaded engagement and wherein said inner rod rotatably engages said load-restraining member.

* * * * *